United States Patent [19]

Insolio et al.

[11] 4,009,813

[45] Mar. 1, 1977

[54] APPARATUS FOR CRACKING PLASTIC SHEET

[75] Inventors: Thomas A. Insolio; Daniel W. Patterson, both of Bristol; Vincent T. Kozyrski, New Britain, all of Conn.

[73] Assignee: The Fletcher-Terry Company, Farmington, Conn.

[22] Filed: Oct. 24, 1975

[21] Appl. No.: 625,372

[52] U.S. Cl. ............................... 225/103; 225/96.5

[51] Int. Cl.[2] ...................... B26F 3/00; C03B 33/02

[58] Field of Search ............... 225/2, 3, 4, 94, 96.5, 225/103, 104; 425/289

[56] References Cited

UNITED STATES PATENTS

| | | | |
|---|---|---|---|
| 787,122 | 4/1905 | Semmer | 225/2 |
| 2,053,375 | 9/1936 | Nicholas | 225/3 |
| 2,212,599 | 8/1940 | Hall | 225/104 |
| 3,259,286 | 7/1966 | LeGras | 225/96.5 |
| 3,567,086 | 3/1971 | Wark et al. | 225/2 |
| 3,726,453 | 4/1973 | Shaffer | 225/96.5 |
| 3,792,989 | 2/1974 | Dahlberg et al. | 225/2 |

FOREIGN PATENTS OR APPLICATIONS

| | | | |
|---|---|---|---|
| 565,407 | 10/1958 | Canada | 225/96.5 |
| 1,259,958 | 1/1972 | United Kingdom | 225/96.5 |

*Primary Examiner*—Frank T. Yost
*Attorney, Agent, or Firm*—McCormick, Paulding & Huber

[57] ABSTRACT

A small anvil is provided below the score line and is resiliently connected to a manually manipulated head above the score line such that the user can push downwardly on the head in order to deflect the sheet material through a desired bend angle along the score line. The head is resiliently supported from a block slidably mounted on an underlying table. The same table also supports the anvil, and the support preferably comprises support rods which extend obliquely inwardly from outside the edge of the sheet so that the head is particularly useful in trimming segments of plastic sheet of less than a foot in longitudinal dimension.

7 Claims, 5 Drawing Figures

APPARATUS FOR CRACKING PLASTIC SHEET

SUMMARY OF INVENTION

This invention relates generally to breaking out fracture sensitive plastic sheet material such as acrylic sheets of the type which are normally provided in widths of approximately 54 inches. More particularly, the present invention relates to a manually operated apparatus utilizing an anvil beneath a scored line on the sheet, with a manually manipulated head being provided above the anvil and being resiliently connected to the anvil such that the user can press downwardly on the head in order to deflect or deform the sheet about the line of score through a critical bend angle of approximately 5° as measured on both sides of the score line.

Acrylic sheets can be cut by a three step score, bend and break method. The fracture sensitive material is scored, and then a fissure is formed by bending, Finally, the sheet is broken out, but rather than being simply broken on the edge of a table or the like, the plastic sheet should be bent, or deflected through an angle of approximately 5° on either side of the score line, that is through an included angle of approximately 170°, to form a fissure at the score line, thereby preventing the breakline from departing from the score line as would be the case if the plastic sheet were to be conventionally broken out in the manner currently used for glass sheet material.

The apparatus includes resilient upper and lower supporting arms which are carried by a block located on an underlying table. The sheet to be broken is provided between a head and an anvil. The anvil also rests on the table, and is connected to the block by the lower arm. The head is connected to the block by the upper arm and both arms extend obliquely across the score line such that the apparatus is particularly useful for trimming the edge of a large plastic sheet to separate sheet segments of less than 12 inches in width from the plastic sheet.

DETAILED DESCRIPTION OF THE PREFERRED EMBODIMENT

Figure 1:
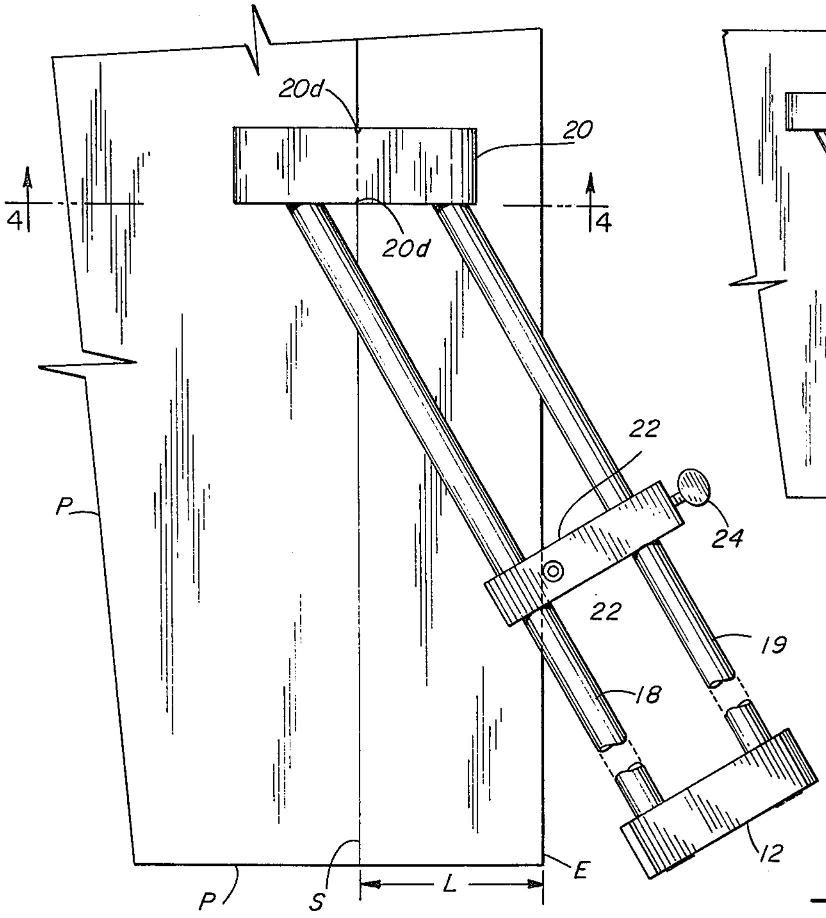
FIG. 1 is a plan view of an apparatus incorporating the present invention illustrating the essential components of the present invention with reference to a plastic sheet which has been scored and is in the process of being deflected or bent to deepen the fissure at the score line prior to the actual breaking step.

Turning now to the drawings in greater detail, FIG. 1 shows a sheet of plastic material having a score line S previously formed in the sheet by conventional means such as by a sharpened knife blade or the like. The plastic sheet may comprise an acrylic material which can be cut by a three step score, bend and break method described in a prior application of the assignee herein, Ser. No. 573,813, filed May 2, 1975, and entitled "Plastic Cutting Method and Apparatus". Such plastic sheet material is generally provided by most manufacturers in widths of approximately 54 inches, and one of the most popular sizes, or thickness such is one-fourth inch in thickness. Such sheet can be conveniently severed by the three step score, bend and break method, but it is an important feature of said method that means must be provided for deepening the fissure at the score line without breaking the sheet.

The present invention seeks to provide an apparatus suitable for bending plastic sheets after they have been scored such that the fissure formed at the score line will not result in an inadvertent break.

In carrying out the present invention we have provided an anvil 10 below the line of score which anvil has a convex upper face defined by the generally flat surface 10*a* and 10*b*, and which anvil has a lower face 10*c* adapted to rest on a worktable or the like as indicated generally at T. The anvil 10 is manually located below the line of score, with the apex of its convex upper face aligned with the score line, and a slide block 12 is conveniently accessible to the workman and serves to permit him to position the anvil 10 as desired as a result of the fact that the anvil 10 is connected to the slide block 12 by means of a pair of support rods 14 and 16 best shown in FIG. 4.

Figure 3:
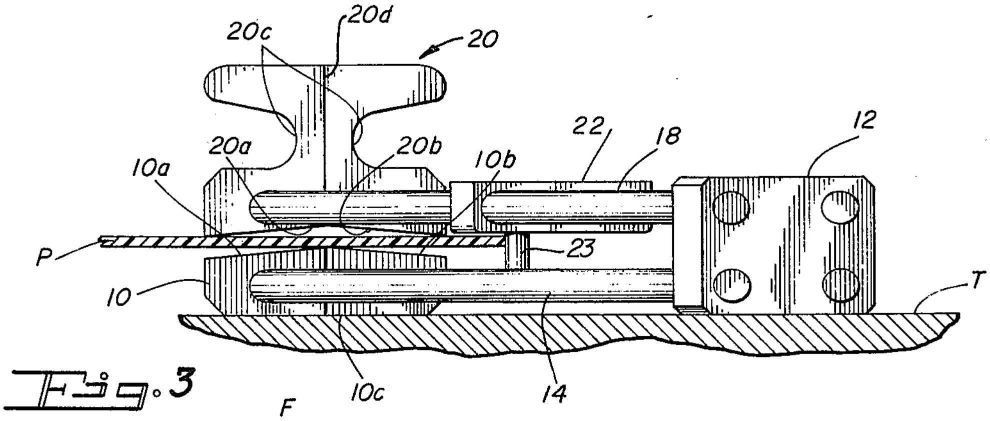
FIG. 3 is a vertical elevation view showing the plastic sheet in section and also showing the underlying table upon which the apparatus is provided.

The apparatus shown in FIG. 3 is of generally C-shaped configuration and includes not only the lower support rods 14 and 16 associated with the anvil 10, but also includes a second pair of support rods 18 and 19 oriented parallel to and spaced above the lower rods 14 and 16 respectively, which upper support rods 18 and 19 are also secured to the slide block 12 as best shown in FIG. 3. These upper and lower support rods, when taken in conjunction with the slide block 12, provide a supporting means for the anvil 10 and also for a manually manipulatable head 20 such that the head 20 is arranged slightly above the anvil 10, at least when the head is in its normal position as depicted in FIG. 3, to accommodate a plastic sheet P therebetween.

Turning now to a more detailed description of the head 20 a concave lower face of generally V-shaped configuration complements that of the V-shaped convex anvil face, and the lower face of the head 20 is more particularly defined by two flat surfaces 20*a* and 20*b* oriented parallel to the faces 10*a* and 10*b* of the anvil 10, but spaced vertically above these faces in order to accommodate the plastic sheet P to be broken as mentioned previously. The head 20 also includes side openings 20*c* best shown in FIGS. 3 and 4 which side openings provide a convenient handle portion of the head 20 adapted to be held by the user in order to apply a force F downwardly on the head 20 as desired to bend the plastic sheet P and form the fissure to the desired depth.

Figure 4:
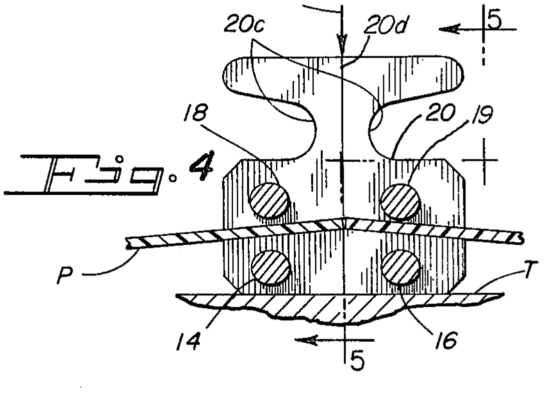
FIG. 4 is a sectional view generally similar to FIG. 3 but illustrating the apparatus in position for bending the plastic sheet.
Figure 5:
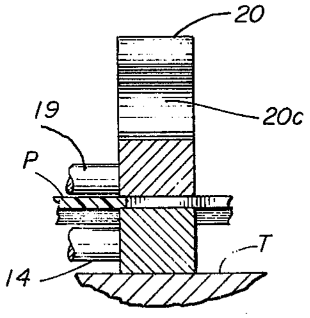
FIG. 5 is a sectional view taken generally on the line 5—5 of FIG. 4.

The force necessary to move the head 20 from the FIG. 3 position to that of FIG. 4 will be determined by the resiliency of the support rods 18, 20. It is an important feature of the present invention that the complimentary V-shape faces 10*a*, 10*b* and 20*a*, 20*b* define an included angle of at least approximately 170°. This geometry assures that the plastic sheet P will be bent from its initial flat planar configuration to a configuration best shown in FIG. 4 where the segments of the plastic sheet P are each bent out of this horizontal flat plane through an angle of at least approximately 5° on either side of the line of score. Still with reference to the head 20 an index line **20*d* is provided on both the vertical face of the head 20 as shown in FIG. 3 and also on the rear face (not shown) of the head 20 to facilitate lining up the head 20 and its associated anvil 10** with the line of score S.

A further feature of the plastic sheet cracking apparatus resides in the provision of an edge guide 22 slidably received on the upper support rods 18 and 19, and including a depending or projecting member 23 engageable with the edge E of the plastic sheet P to be cracked. This edge guide 23 is adapted to be positioned at any desired position along the support rods 18 and 19 by means of a thumb screw 24 threadably received in the edge guide 22 and adapted to be clamped against the surface of the support rod 19 as best shown in FIG. 1. The edge guide 22 and associated projecting pin 23 will be found to be particularly useful where a 54 inch acrylic sheet to be broken must be handled.

Figure 2:
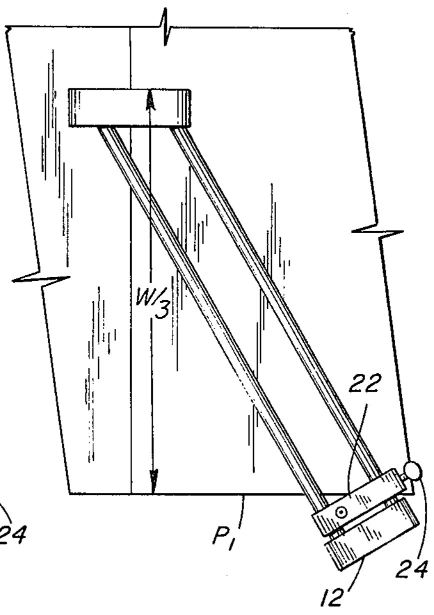
FIG. 2 is a view similar to FIG. 1 but drawn to a slightly smaller scale and illustrates how the apparatus would be setup to cut relatively large plastic sheets into relatively large segments.

The geometry of the preferred embodiment of the present invention is preferably such that the anvil and head will extend inwardly around such a sheet to a distance of approximately one-third of its width that is to a distance of approximately 18 inches. Thus, the anvil and head can be slid inwardly behind the plastic sheet to be broken out from both the near side P1 of a relatively large sheet and subsequently from the far side (not shown) of the sheet in order to break out the opposite marginal edge portions of the relatively large segment as suggested in FIG. 2. After having broken out the approximately 18 inch marginal side edge portions of such a sheet as suggested in FIG. 2 one can merely place the plastic sheet on a table edge or the like in order to break out the intermediate or central one-third of the sheet by the more conventional two step score and break process familiar to anyone who has scored and broken glass sheet.

Actually, the oblique configuration for the supporting rod means is choosen in order to facilitate the more commonly encountered necessity for trimming the edge of a plastic sheet in order to remove segments of the sheet less than 12 inches in lateral dimension L. FIG. 1 shows this particular use of the plastic sheet cracking apparatus, and also illustrates the use being made of the edge guide 22 in order to faciliate the proper alignment of the anvil and head with the line of score S.

We claim:

1. Apparatus for manually cracking plastic sheet material along a line of score, and comprising:

a. an anvil having a convex upper face of V-shaped configuration, and having a lower face adapted to rest on a worktable or the like, b. a breaker head having a concave lower face of V-shaped configuration complementing said V-shaped anvil face, c. means supporting the anvil and head so that they are normally spaced from one another by an amount at least sufficient to accommodate the plastic sheet to be broken therebetween, d. said supporting means including a block with a lower face also adapted to rest on the worktable, and upper and lower arms connecting said block to said head and anvil respectively, said arms being parallel to one another, and said upper arm being resilient to permit movement of said head toward said anvil in response to a downward force applied to said head.

2. Apparatus according to claim 1 wherein said complementary V-shaped faces of said anvil and said head each define an included angle of at least approximately 170°.

3. Apparatus according to claim 1 wherein said anvil and head are of generally rectangular planform configuration said head having at least one index line cooperating with the apex of its V-shaped lower face to define a plane normal to the plane of the sheet to be broken.

4. Apparatus according to claim 2 wherein said anvil and head are of generally rectangular planform configuration, said head having at least one index line cooperating with the apex of its V-shaped lower face to define a plane normal to the plane of the sheet to be broken.

5. Apparatus according to claim 3 wherein said upper and lower arms are oriented obliquely with respect to said normal plane through said score line.

6. Apparatus according to claim 5 wherein said complementary V-shaped faces of said anvil and said head each define an included angle of at least approximately 170°.

7. Apparatus according to claim 5 further characterized by an edge guide slidably received on at least one of said arms and adapted to be releasably clamped to said arm, and a projecting portion of said edge guide to manually locate the head and anvil at selected positions along the line of score.

* * * * *